Oct. 18, 1949.                J. F. GRACE                    2,485,280
                         DIFFERENTIAL SCREW JACK
Filed Jan. 16, 1947                                     3 Sheets-Sheet 1

JOHN F. GRACE
    INVENTOR.

BY

Oct. 18, 1949.　　J. F. GRACE　　2,485,280
DIFFERENTIAL SCREW JACK

Filed Jan. 16, 1947　　　　　　　　　　　　　3 Sheets-Sheet 2

JOHN F. GRACE
　　　　INVENTOR.
BY

Oct. 18, 1949.   J. F. GRACE   2,485,280
DIFFERENTIAL SCREW JACK
Filed Jan. 16, 1947   3 Sheets-Sheet 3

JOHN F. GRACE
INVENTOR.
BY [signature]
attorney

Patented Oct. 18, 1949

2,485,280

UNITED STATES PATENT OFFICE 2,485,280

DIFFERENTIAL SCREW JACK

John F. Grace, Arlington, N. J., assignor to Worthington Pump and Machinery Corporation, Harrison, N. J., a corporation of Delaware Application January 16, 1947, Serial No. 722,423

10 Claims. (Cl. 254—98)

This invention relates to devices which convert an applied torque to an axial force and includes apparatus such as a screw jack or a simple nut and bolt connection for a flanged joint.

More particularly, a first member such as a bolt has two portions threaded to different pitches and each portion has an engaging member such as a nut. If the device is under a load and a torque is applied to the first member, a single revolution of the first member will urge an axial travel of one of the threaded portions relative to its engaging member which differs from the axial travel urged of the other threaded portion relative to its engaging member by the amount of difference in their pitches. Whether this "urge" is satisfied by axial deformation of the device or movement of the load depends on the condition under which the invention is employed. Since the difference between the pitches is known, as well as the number of revolutions made in tightening or applying torque to the device, the amount of movement of the load or deformation (hence the stress) of the device may be easily determined.

The applications of the invention may be grouped in two broad categories, viz., those involving yielding loads and those involving non-yielding loads. A screw jack in accordance with this invention is particularly applicable to certain cases of yielding loads and may be used to control small movements of the load and obtain high mechanical advantage. An important example of a non-yielding load is a flanged joint of a vessel subject to high pressure. In connecting the flanges of such a joint by a bolt and nut it is necessary to know and control the tension in the bolt so as to avoid premature failure due to overstressing or a loose joint due to understressing. While a torque wrench is sometimes employed for this purpose, there are certain practical objections and limitations to its use for controlling the residual tension in the bolt, as those skilled in the art realize. However, the residual axial stress due to adjustment in the bolts of such joints may be quickly and accurately controlled or determined when the connection embodies the features of this invention thereby eliminating much speculation as to the strength and safety of the joint.

Summarily, the general object of this invention is to provide a force applying device in which the results of an applied torque in terms of axial movement or stress may be predetermined and therefore controlled.

A specific object of the invention is to provide a connection for high pressure joints in which the bolt tension may be simply and accurately adjusted to a predetermined value without the use of auxiliary measuring equipment.

Another specific object of the invention is to provide an economical screw jack having a high mechanical advantage and adapted to move heavy loads a small distance.

With these and other objects in view, as may appear from the accompanying specification, the invention consists of various features of construction and combination of parts, which will be first described in connection with the accompanying drawings, showing a torque converting apparatus of a preferred form embodying the invention, and the features forming the invention will be specifically pointed out in the claims.

Figure 2:
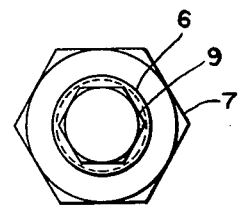
Figure 2 is a plan view of the bolt connection shown in Figure 1.
Figure 1:
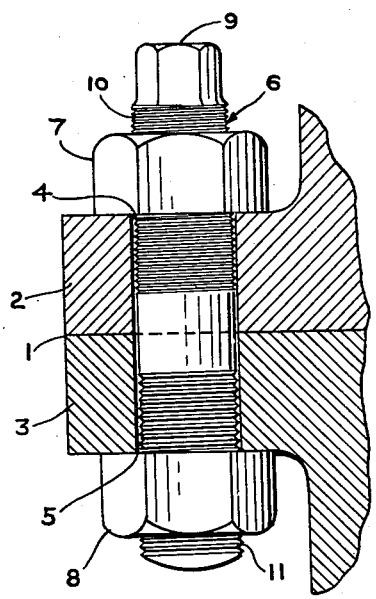
Figure 1 is sectional view of a flanged joint connected by a bolt and nuts embodying the features of the invention.

Figures 1 and 2 show a simple but important application of the principle of this invention to a flanged joint 1 formed by the two flanges 2 and 3 having registering holes 4 and 5 respectively. A bolt or threaded member 6 extends through the holes 4 and 5 and is engaged by standard nuts 7 and 8 which abut the opposite exterior faces of the flanges 2 and 3. The bolt 6 has one end 9 hexagonally shaped to receive a wrench whereby the torque may be applied to the connection and pressure applied to the joint 1, nuts 7 and 8, of course, being restrained from rotation during the tightening operation.

The bolt 6 has one portion 10 threaded to a different pitch than the other portion 11 and the engaging nuts 7 and 8 are correspondingly threaded.

If it is assumed that portion 10 has A threads per inch and portion 11 has a lesser number of threads B per inch, then the pitch $a$ of portion 10 will be less than the pitch $b$ of portion 11. When the nuts 7 and 8 are engaged to fit snugly against the flanges, a single clockwise rotation of the bolt 6 will cause a relative axial movement of the bolt and nut 7 equal to the pitch $a$ of portion 10 and a movement in the same direction of $b$ with respect to the nut 8. Since $a$ and $b$ are different quantities, the bolt 6 will stretch an amount equal to $b$ minus $a$ or the difference between the pitches. Further application of torque to bolt 6 will increase the stretching or axial deformation of the bolt in an amount proportionate to the number of revolutions of the bolt. The total amount of axial deformation will be substantially equal to the difference in pitches multiplied by the number of revolutions of the bolt after a snug connection was obtained. With this information the tension in the bolt or compression of the joint may be easily calculated from elementary formulae providing plastic or permanent deformation has not occurred. By specifying the number of turns to be taken up on the bolts 6, the designer or engineer may control the prestressing of the connections for the joint—an obviously important factor in the design and maintenance of apparatus having joints under high pressure.

Figure 3:
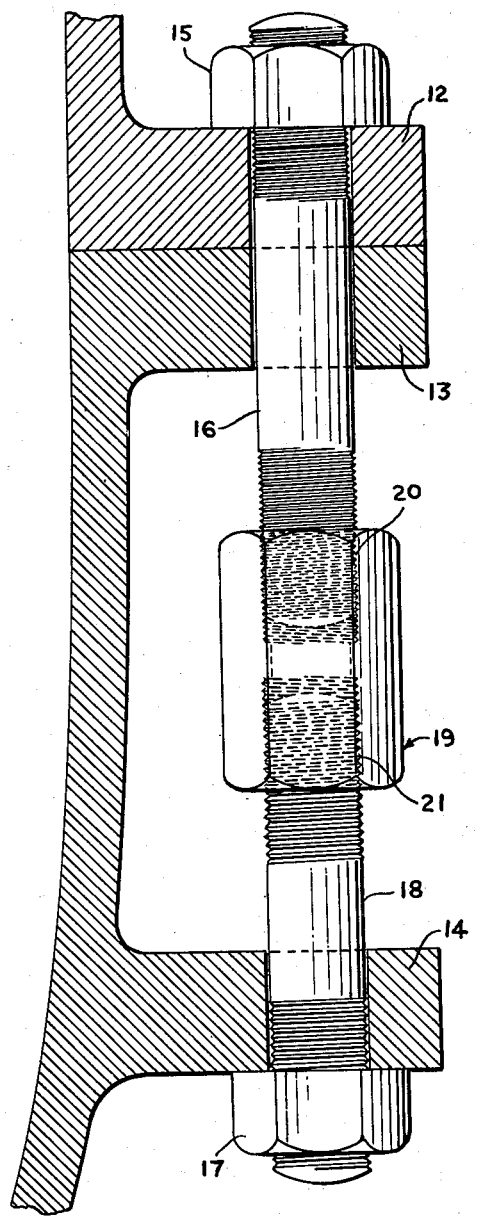
Figure 3 is a sectional view of a joint having spaced flanges connected by a modified form of the invention.

Figure 3 shows an alternate form of the invention which is useful in connecting spaced flanges or lugs. The flanges 12 and 13 and the flange 14 spaced therefrom have registering holes. A nut 15 abuts the exterior of the flange 12 and is threadably engaged to the bolt 16 which extends through the holes in flanges 12 and 13. A nut 17 abuts the exterior of flange 14 and is threadably engaged to the bolt 18 which extends through the hole in flange 14. The bolts 16 and 18 are threadably engaged in opposite ends 20 and 21 of the threaded member 19, which has an external hexagonal shape to receive torque. The two ends 20 and 21 have threads of different pitch so that upon tightening of the connection an axial deformation equal to the difference in the pitches will occur for each revolution and the stresses may be controlled in the manner discussed for Figures 1 and 2.

Figure 5:
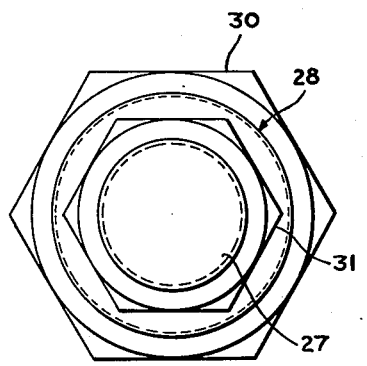
Figure 5 is a plan view of the bolt connection shown in Figure 4.
Figure 4:
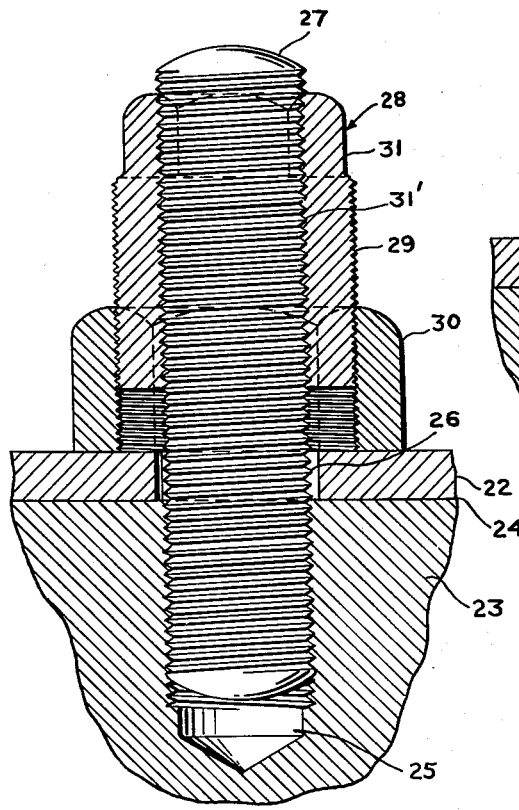
Figure 4 is a sectional view of a joint connected by a further modification of the invention, wherein one of the joined members has a tapped hole for receiving the bolt.

Figures 4 and 5 show a further modification in which the invention is used to connect members 22 and 23 in joint 24 where the member 23 has a threaded bore 25 and the member 22 has a hole 26 registering therewith. The bolt member 27 extends through the hole 26 and is threadably engaged to member 23 in the tapped bore 25. A collar or sleeve-like threaded member 28 is threadably engaged to the bolt 27 and also has an external threaded portion 29 which engages the nut 30 abutting the member 22. Threaded member 28 is adapted at 31 to receive torque. The internal threaded portion 31' of threaded member 28 has a greater pitch than the outer portion 31 so that one revolution of the threaded member 28 will stretch the bolt 27 an amount substantially equal to the difference between the pitches thereby creating a predetermined stress condition in the connection as discussed for Figures 1 and 2. This is readily understood if the pitch of the internal portion 31' is designated $b$ and that of the external portion designated $a$, where the pitch $b$ is greater than $a$. One clockwise revolution to tighten member 28 will cause it to move downwardly the distance $a$ in the nut 30. The member 28 is urged to move downwardly a distance $b$ on the bolt 27 but is prevented from doing so by the nut. A complete revolution of the engaging threads 31' must occur, however, and this can be accomplished if the bolt stretches the amount $b-a$. Knowing the elongation per revolution, the tension in bolt 27 or compression on joint 24 may be readily calculated for various conditions.

Figure 7:
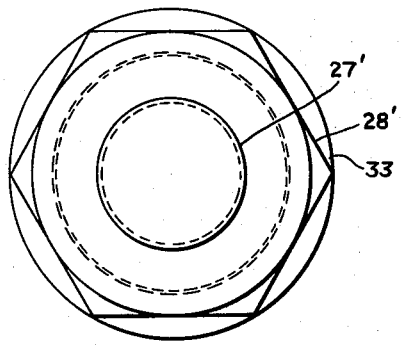
Figure 7 is a plan view of the bolt connection shown in Figure 6.
Figure 6:
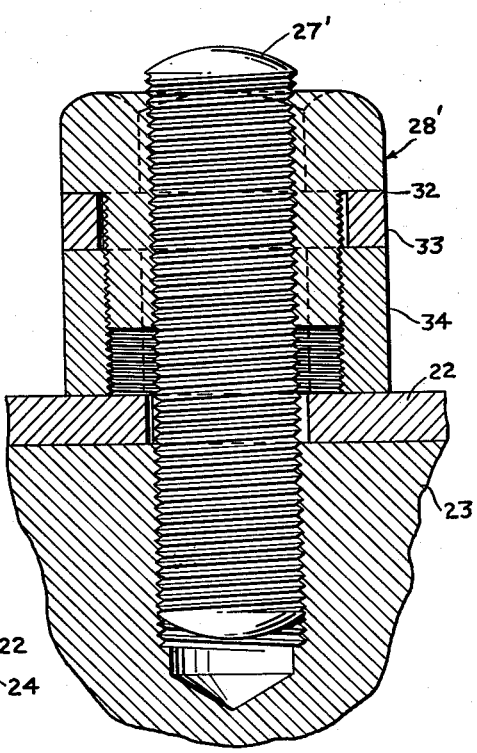
Figure 6 is a sectional view showing a modification of the invention in Figure 4.

The device of Figures 6 and 7 is similar to that just described for Figures 4 and 5 except that the threaded member 28' has a shoulder or flange 32 and a spacing member 33 is inserted between the shoulder and the nut 34. The spacing member 33 is of appropriate thickness to obtain the desired tension in the bolt 27'. In the event of subsequent disassembly of the connection, the original tension may be quickly reached on reassembly by tightening the connection until shoulder 32 abuts the spacing ring 33. This, of course, is also the maximum degree of tightening which is possible with such an arrangement of parts.

Figure 8:
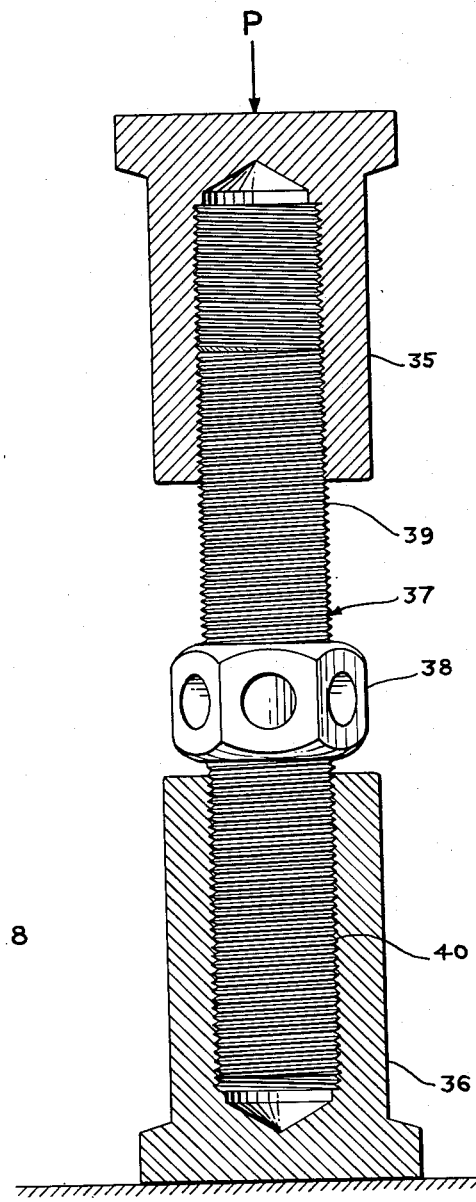
Figure 8 is a sectional view of a screwjack embodying the features of the invention.

Figure 8 shows a screw jack predicated upon the features of the invention. An upper member 35 is internally threaded and adapted to contact the yielding load P and a base member 36 is also internally threaded. The members 35 and 36 may be of various designs, and each are shown as consisting simply of a cylindrical section having a flange at one end. A threaded member 37, of bolt form, is adapted at its center section 38 to receive torque and threadably engages the upper member 35 at its upper portion 39 and the base member 36 at its lower portion 40. The upper and lower threaded portions 39 and 40 of the threaded member 37 are of different pitch, the lower portion 40 having the greater pitch. One clockwise revolution of the threaded member 37 will cause a greater part of its length to leave the base member 36 than enters the upper member 35, which is prevented from rotating by engagement with load P. The difference between the length leaving the base 36 and that entering the upper member 35 amounts to the difference in the pitches and is the distance which the load is elevated.

A jack of this type having a threaded member 37 with the upper portion 39 at 8 threads per inch and the lower portion 40 at 7 threads per inch will theoretically raise the load 0.01787 inch per revolution and will have a lifting ratio of 6350 to 1 at 18 inches. Its advantages are thus obvious for lifting heavy loads over small distances as, for example, in making final adjustments prior to a joining operation between a condenser inlet and a turbine exhaust.

It will be understood that the jack could also be made with an internally differentially threaded member 37 and externally threaded engaging members 35 and 36 without departing from the spirit of the invention.

It will be understood that the invention is not to be limited to the specific construction or arrangement of parts shown, but that they may be widely modified within the invention defined by the claims.

What is claimed is:

1. In a device for converting a tangential applied force to an axial force, a threaded member having a first threaded portion and a second threaded portion threaded in the same direction; threaded means for engaging the first threaded portion, threaded means for engaging the second threaded portion, said threaded portions having equal diameters but having different pitches so that a revolution of the threaded member relative to the threaded means when the device is under a yielding load will cause a predetermined axial movement of the load substantially equal to the difference between the pitches of said first and second threaded portions and when the device is under a non-yielding load will cause an axial stress in the threaded member substantially equal to that associated with an axial deformation of said member of an amount equal to the difference between the pitches of the first and second threaded portions.

2. In a device for converting a torque to an axial force, a threaded member having a first threaded portion and a second threaded portion threaded in the same direction, threaded means for engaging the first threaded portion, threaded means for engaging the second threaded portion, said threaded portions having equal diameters but having different pitches so that a revolution of the threaded member relative to the threaded means when the device is under a non-yielding load will cause a predetermined relative axial movement between the ends of the threaded member and when the device is under a yielding load will cause a predetermined axial movement of the load, said predetermined movements being substantially equal to the difference between the pitches of said first and second threaded portions.

3. In a device for converting a tangential applied force to an axial force, a threaded member having a first threaded portion at least eight threads to the inch and a second threaded portion at least seven threads to the inch but always less than the number of threads to the inch on the first threaded portion, threaded means for engaging the first threaded portion, threaded means for engaging the second threaded portion, said threaded portions threaded in the same direction and of equal diameter so that a revolution of the threaded member relative to the threaded means when the device is under a yielding load will cause a predetermined axial movement of the load substantially equal to the difference between the pitches of said first and second threaded portions and when the device is under a non-yielding load will cause an axial stress in the threaded member substantially equal to that associated with an axial deformation of said member of an amount equal to the difference between the pitches of the first and second threaded portions.

4. In a device for converting torque to an axial force, a threaded member having a first threaded portion at least eight threads to the inch and a second threaded portion at least seven threads to the inch but always less than the number of threads to the inch on the first threaded portion, threaded means for engaging the first threaded portion, threaded means for engaging the second threaded portion, said threaded portions threaded in the same direction and of equal diameter so that a revolution of the threaded member relative to the threaded means when the device is under a non-yielding load will cause a predetermined relative axial movement between the ends of the threaded member and when the device is under a yielding load will cause a predetermined axial movement of the load, said predetermined movements being substantially equal to the difference between the pitches of said first and second threaded portions.

5. In a screw jack, a threaded member having a first threaded portion and a second threaded portion and a portion adapted to receive torque, said threaded portions having different pitches, an upper member threadably connected for axial movement along said first threaded portion and adapted to contact the load to be lifted, a base member threadably engaged to the second threaded portion whereby when rotative motion is applied to said torque receiving portion the second threaded portion will move outward of said base member and inward of said upper member moving said upper member a predetermined total distance equal to the difference between the pitches of the first and second threaded portions.

6. In a screw jack, a threaded member having an upper threaded portion at least eight threads to the inch and a lower threaded portion at least seven threads to the inch but always smaller than the number of threads in the upper threaded portion per inch and a portion adapted to receive torque, an upper member threadably connected for axial movement along said first threaded portion and adapted to effectively contact the load to be lifted, a base member threadably engaged to the second threaded portion whereby when rotative motion is applied to the torque receiving portion the second threaded portion will move outward of said base member and inward of said upper member moving said upper member a predetermined distance equal to the difference between the number of threads of the first and second threaded portions.

7. In a screw jack, an upper load contacting member having an internally threaded bore and a base member having an internally threaded bore of different pitch, a threaded bolt member threadably connected at one end to said internally threaded bore of said upper member to move in and out of said member and to move said member in an axial direction, said threaded member connected at the other end thereof to said internally threaded bore of said base member whereby when said threaded member moves inwardly of said upper member it moves outwardly of said base member and vice versa, a portion of said threaded bolt member adapted to receive torque, said threaded member and said upper and base member constructed and arranged so that when rotative motion is applied to said torque receiving portion said upper member will move a distance equal to the difference in the pitch of the threaded bores in said upper member and said base member.

8. In a screw jack, an upper load carrying member having an internally threaded bore at least eight threads to the inch and a base member having an internally threaded bore at least seven threads to the inch but always smaller than the number of threads in the internally threaded bore of the upper load carrying member, a threaded bolt member threadably connected at one end to said internally threaded bore of said upper member to move in and out of said member and to move said member in an axial direction, said threaded member connected at the other end thereof to said internally threaded bore of said base member whereby when said threaded member moves inwardly of said upper member it moves outwardly of said base member and vice versa, a portion of said threaded bolt member adapted to receive torque, said threaded member and said upper and base member constructed and arranged so that when rotative motion is applied to said torque receiving portion said upper member will move a distance equal to the difference in the pitch of the threaded bores in said upper member and said base member.

9. In a screw jack, an upper member and a base member, a flange on said upper member to adapt it for contact with a yielding load, an internally threaded bore in said upper member, a flange on said base member to adapt it for contact to a non-yielding surface, an internally threaded bore in said base member of different pitch than the said internally threaded bore of the upper member but threaded in the same direction, a threaded bolt member connected at one end to said internally threaded bore of said upper member and at the other end to said internally threaded bore of said base member and having a central portion to receive torque, said threaded bolt member and said internally threaded bores constructed and arranged so that on rotation of said threaded member the threaded member will move inward of one internally threaded bore and outward of the other internally threaded bore moving the upper member in an axial direction dependent on the direction of the rotative force.

10. In a screw jack, an upper member and a base member, a flange on said upper member to adapt it for contact with a yielding load, an internally threaded bore in said upper member, a flange on said base member to adapt it for contact to a non-yielding surface, an internally threaded bore in said base member of different pitch than the said internally threaded bore of the upper member but threaded in the same direction, a threaded bolt member connected at one end to said internally threaded bore of said upper member and at the other end to said internally threaded bore of said base member and having a central portion to receive torque, said threaded bolt member and said internally threaded bores constructed and arranged so that on rotation of said threaded member the threaded member will move outwardly of one of said internally threaded bore and inwardly of the other of said internally threaded bore and vice versa depending on the direction of axial movement of the upper member contacting the yielding load.

JOHN F. GRACE.

REFERENCES CITED

The following references are of record in the file of this patent:

UNITED STATES PATENTS

| Number | Name | Date |
| --- | --- | --- |
| 264,020 | Yakel | Sept. 5, 1882 |
| 909,808 | Laughterback | Jan. 12, 1909 |
| 1,128,997 | Morden | Feb. 16, 1915 |
| 1,163,679 | Mueller | Dec. 14, 1915 |
| 1,278,651 | Heymann | Sept. 10, 1918 |
| 1,953,172 | Griffiths | Apr. 3, 1934 |
| 2,070,084 | Key | Feb. 9, 1937 |
| 2,091,085 | Scholtes | Aug. 24, 1937 |
| 2,166,106 | Gormley | July 18, 1939 |

FOREIGN PATENTS

| Number | Country | Date |
| --- | --- | --- |
| 5,951 | Great Britain | 1884 |
| 14,070 | Great Britain | 1895 |